(12) United States Patent
Tanaka (10) Patent No.: US 7,256,939 B2
(45) Date of Patent: Aug. 14, 2007

(54) DIFFRACTIVE OPTICAL ELEMENT AND FABRICATION METHOD THEREOF

(75) Inventor: Issei Tanaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 102 days.

(21) Appl. No.: 11/091,412

(22) Filed: Mar. 29, 2005

(65) Prior Publication Data
US 2005/0219698 A1 Oct. 6, 2005

(30) Foreign Application Priority Data
Mar. 30, 2004 (JP) ............................. 2004-099133
Mar. 7, 2005 (JP) ............................. 2005-062710

(51) Int. Cl.
*G02B 5/18* (2006.01)
(52) U.S. Cl. ..................................... 359/576
(58) Field of Classification Search ........ 359/565–576, 359/742; 369/112.03
See application file for complete search history.

(56) References Cited

U.S. PATENT DOCUMENTS

| 5,847,877 A | 12/1998 | Imamura et al. ............. 359/566 |
| 6,606,200 B1 | 8/2003 | Nakayama et al. .......... 359/686 |
| 7,042,642 B2 * | 5/2006 | Tokoyoda et al. .......... 359/576 |
| 7,070,862 B1 * | 7/2006 | Miyakawa et al. ....... 428/425.6 |
| 2003/0218803 A1 | 11/2003 | Nakabayashi ............... 359/566 |
| 2006/0171031 A1 | 8/2006 | Suzuki ........................ 359/565 |

FOREIGN PATENT DOCUMENTS

| JP | 62238502 | * 10/1987 |
| JP | 9-127321 A | 5/1997 |
| JP | 2005-107298 | 4/2005 |
| WO | 2005/031404 | 4/2005 |

* cited by examiner

*Primary Examiner*—Alessandro Amari
(74) *Attorney, Agent, or Firm*—Miles & Stockbridge P.C.

(57) ABSTRACT

A diffractive optical element 1 comprises a first element 10 and a second element 20, whose materials are different from each other. These elements are bonded to each other, with a diffraction grating 30 created on the boundary surface between the first element 10 and the second element 20, and in the diffractive optical element 1, at least the second element 20 is made from a photo-setting resin, which is set by light rays incident through the first element 10. The diffractive optical element 1 is set in a predetermined range of values including values that make the transmittance T1 of the first element 10 and the transmittance T2 of the second element 20 equal to each other for the light rays. As a result, as differences in cure shrinkage in the second element 20 are generated by differences in the intensity of the light rays caused from ups and downs of the diffraction grating 30 created on the surface of the first element 10, the differences in cure shrinkage are controlled within a range so as not to degrade the desired performance of the diffractive optical element 1.

11 Claims, 4 Drawing Sheets

DIFFRACTIVE OPTICAL ELEMENT AND FABRICATION METHOD THEREOF

INCORPORATION BY REFERENCE

The disclosures of the following priority applications are herein incorporated by reference:

Japanese Patent Applications No. 2004-099133 filed on Mar. 30, 2004 and No. 2005-062710 filed on Mar. 7, 2005.

FIELD OF THE INVENTION

The present invention relates generally to a diffractive optical element and a fabrication method thereof and particularly to a diffractive optical element and a fabrication method thereof which optical element is applicable for a plurality of wavelengths or bandwidths, for example, in a photographic optical system, a binocular, a telescope, a microscope and the like.

BACKGROUND OF THE INVENTION

There is a conventional method of employing an diffractive optical element for reducing chromatic aberrations. In this method, a diffractive optical element is provided on a lens surface, or it is provided not on a lens surface but at another part of an optical system.

A diffractive optical element is an optical element which has a grating with a large number of very fine and evenly spaced parallel grooves or slits, the number being several hundreds per minute interval (for example, per 1 mm). This optical element has a characteristic that a beam of light, before passing through the optical element, goes through a change in direction which is defined by the wavelength of the light and the pitch (clearance) of the grooves or slits of the diffraction grating. Such diffractive optical elements are used in various types of optical systems. For example, a diffractive optical element is used as a lens to focus light rays with a specific order of diffraction for reducing chromatic aberrations.

In recent years, a so-called multilayer diffractive optical element has been proposed as such a diffractive optical element. This type of diffractive optical element comprises a plurality of diffractive elements, which are placed one over another, each element having a surface formed with a sawtooth-like cross section. This type of diffractive optical element displays a high diffraction efficiency for almost all region in a desired wavelength range (for example, the visible light range), so it offers good wavelength characteristics.

A well known multilayer diffractive optical element is a bonded bilayer diffractive optical element, in which, for example, two types of diffractive optical elements made from different materials are bonded together at their identical diffraction gratings (for example, refer to Japanese Laid-Open Patent Publication No. H9(1997)-127321).

For fabricating such a bonded bilayer diffractive optical element, there is a replica method. In this method, a photo-setting resin is dropped on a base plate, and the dropped resin is stamped with a metal die that has a relief whose shape is counter to a desired grating. Then, the stamped resin is cured by a light beam from a light source for setting the resin in the shape of an optical element before it is removed from the plate and the metal die.

In a case where a bonded bilayer diffractive optical element is fabricated by such a replica method, a first ultraviolet-curable resin and a second ultraviolet-curable resin, which are different from each other, are prepared as materials for forming the optical element. Firstly, the first ultraviolet-curable resin dropped on a base plate is stamped with a metal die having a counter relief of a desired diffraction grating, and this resin is treated with an ultraviolet light beam. After the resin has cured, the metal die is removed from the resin, which is now set as a first diffractive element. Secondly, the second ultraviolet-curable resin is dropped on the surface which has the diffraction grating of the first diffractive element, and this resin is stamped with a metal die for surface formation and treated with an ultraviolet light beam for curing. Finally, the surface-forming metal die is removed from the latter resin, which is now set as a second diffractive element. As a result of this procedure, an diffractive optical element is created, comprising these two elements, one from the first ultraviolet-curable resin and the other from the second ultraviolet-curable resin, bonded at the common diffraction grating.

In this fabrication method, which is a replication technology, the ultraviolet-light irradiation for curing the second ultraviolet-curable resin is performed from the side of the first ultraviolet-curable resin. In general, since a photo-setting resin such as an ultraviolet-curable resin has a relatively low transmittance, thick part of an element made from a photo-setting resin has a transmittance lower than the other part. This tendency is remarkable especially in short-wavelength region.

Because of this phenomenon, when the second ultraviolet-curable resin is irradiated through the first ultraviolet-curable resin, there is a gradient in the intensity of light through the layer of the second ultraviolet-curable resin. This light-intensity gradient causes differences in cure shrinkage, which results in ripples or a so-called embossing on the surface of the second ultraviolet-curable resin. This embossing of ripples has a periodicity as it is caused by the up-and-downs of the diffraction grating. As a result, this embossing itself exhibits somewhat an effect of a diffraction grating. This means that the diffractive optical element fabricated by the replication technology acquires a diffraction grating on the surface of the second ultraviolet-curable resin in addition to the originally intended diffraction grating, which is created at the boundary surface of the first and second ultraviolet-curable resin layers. This is a problem in achieving a desired optical performance.

SUMMARY OF THE INVENTION

In consideration of the above mentioned problem, it is an object of the present invention to provide a diffractive optical element and a fabrication method thereof, which can reduce postcure inaccuracy (embossing) caused by a diffraction grating created on a boundary surface and by the different transmittances of materials and which can improve transferability of a formed pattern.

To achieve this objective, the present invention provides a diffractive optical element comprising a first element and a second element, whose materials are different from each other and which elements are bonded to each other, with a diffraction grating created on the boundary surface between the first element and the second element. In the diffractive optical element, at least the second element is made from a photo-setting resin, which is set by light rays incident through the first element, and the diffractive optical element is set in a predetermined range of values including values that make the transmittance of the first element and the transmittance of the second element equal to each other for the light rays. As a result, as differences in cure shrinkage in the second element are generated by differences in the intensity of light rays caused from ups and downs of the diffraction grating created on the surface of the first element, the differences in cure shrinkage are controlled within a range so as not to degrade the desired performance of the diffractive optical element.

In this case, it is preferable that the diffractive optical element satisfy the following formula.

$$0.990 \leq (T2/T1)^{(H/10000)} \leq 1.010$$

In the formula, the "H" (unit: μm) represents the height of the diffraction grating, and the "T1" represents the transmittance per 10 mm through the first element while the "T2" represents the transmittance per 10 mm through the second element for the second element to be cured by the light rays being transmitted through the first element.

It is also preferable that the light rays that pass through the first element and cure the second element be ultraviolet rays, and that the ultraviolet rays be in i-line.

Furthermore, it is preferable that the first element be made from an ultraviolet-curable resin.

The present invention provides also a method for fabricating a diffractive optical element that comprises a first element and a second element, whose materials are different from each other and which elements are bonded to each other, with a diffraction grating created on the boundary surface between the first element and the second element. The method comprises a step of embossing the first element by stamping the first element with a die that has a diffraction grating for forming the first element, a step of setting the first element, which has been formed by the embossing, a step of removing the first element from the die, a step of dropping a photo-setting resin on the surface of the first element where the diffraction grating has been created, and a step of forming the second element by treating the dropped photo-setting resin with light rays being passed through the first element so as to cure the photo-setting resin. For forming the second element by curing the photo-setting resin with light rays incident through the first element, the diffractive optical element is set in a predetermined range of values including values that make the transmittance of the first element and the transmittance of the second element equal to each other for the light rays. In this way, as differences in cure shrinkage in the second element are generated by differences in the intensity of light rays caused from ups and downs of the diffraction grating, which has been created on the surface of the first element, the differences in cure shrinkage are controlled within a range so as not to degrade the desired performance of the diffractive optical element.

In the fabrication method, it is preferable that the diffractive optical element satisfy the following formula.

$$0.990 \leq (T2/T1)^{(H/10000)} \leq 1.010$$

In the formula, the "H" (unit: μm) represents the height of the diffraction grating, and the "T1" represents the transmittance per 10 mm through the first element while the "T2" represents the transmittance per 10 mm through the second element for the second element to be cured by the light rays being transmitted through the first element.

It is also preferable that the light rays that pass through the first element and cure the second element be ultraviolet rays, and that the ultraviolet rays be in i-line.

As described above, as an unwanted embossing is generated on the surface (opposite to the surface where a diffraction grating is created) of the second element because of the existence of the diffraction grating on the boundary surface between the first element and the second element, the diffractive optical element according to the present invention effectively reduces this unwanted embossing. As a result, the diffractive optical element according to the present invention can achieve a desired optical performance because it reduces the diffractive effect caused by factors other than the originally intended diffraction grating, which is created on the boundary surface between the first element and the second element (ultraviolet-curable resin).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIGS. 5A, 5B and 5C show modifications to the diffractive optical element according to the present invention.

DESCRIPTION OF THE PREFERRED EMBODIMENTS

Figure 1:
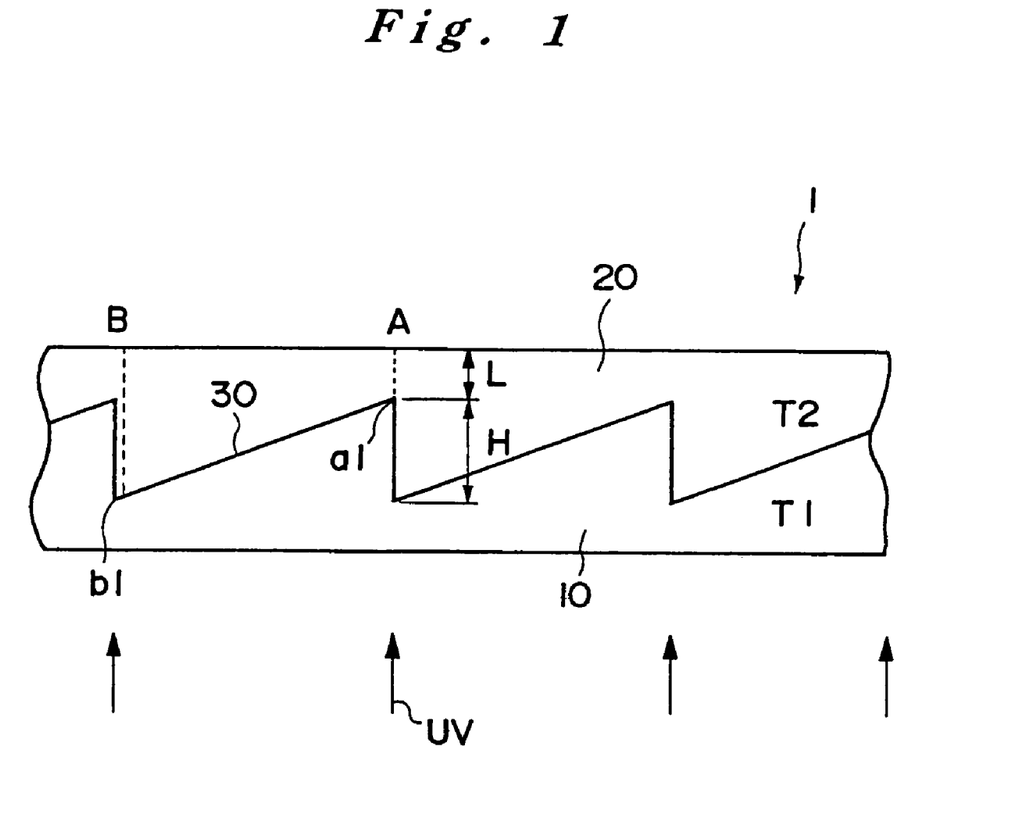
FIG. 1 is a cross-sectional view of a bonded bilayer diffractive optical element according to the present invention.

Now, preferred embodiments according to the present invention are described in reference to the drawings. FIG. 1 is a schematic diagram to describe a diffractive optical element according to the present invention, and it is a cross-sectional view of a bonded bilayer diffractive optical element. The diffractive optical element 1 as an embodiment of the present invention comprises a first element 10 and a second element 20, which are made from different materials and bonded together at a common diffraction grating 30 as shown in FIG. 1. At least the second element 20 is made from such a photo-setting resin as cured by an ultraviolet-light irradiation like one represented by the i-line of mercury.

Furthermore, preferably each of the first and second elements 10 and 20 constituting the diffractive optical element 1 is made from an ultraviolet-curable resin. In this way, the diffractive optical element 1 according to the present invention can be mass-produced efficiently only by repeating twice a process of dropping a material on a metal die and setting the dropped material by an ultraviolet-light irradiation. Moreover, the construction of the diffractive optical element 1, in which the first element 10 and the second element 20 are bonded to each other, effectively prevents abrasion of the diffraction grating 30, which is positioned between them.

In the fabrication of the diffractive optical element 1 according to the present invention, a material for the second element 20 is dropped on the diffraction grating 30, which has been created on the first element 10, and the material for the second element 20 is cured by the ultraviolet light UV that is radiated through the first element 10 as shown in FIG. 1 (this fabrication method is detailed later). In this incidence, there are gradients in the intensity of the light through the layer of the second element 20 because of a difference in transmittance between the first and second elements 10 and 20 and of the effect of the diffraction grating 30 (refer to FIG. 2A and FIG. 3A). These light-intensity gradients cause differences in cure shrinkage, which result in ripples or a so-called embossing D on the surface of the second element 20.

Figure 2A:
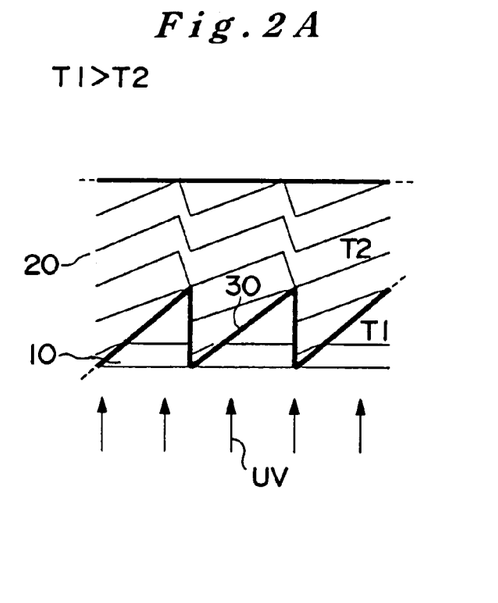
FIG. 2A shows contour lines that describe the distribution of light intensity for a case where the transmittance of a first element is higher than that of a second element.
Figure 2B:
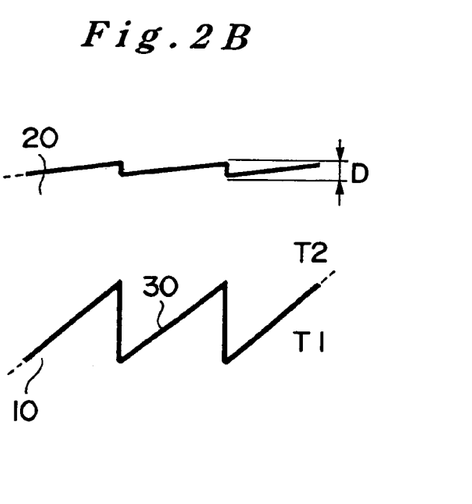
FIG. 2B is a schematic diagram that describes the condition of the resin as the second element cured by a light irradiation for the same case, where the transmittance of the first element is higher than that of the second element.
Figure 3A:
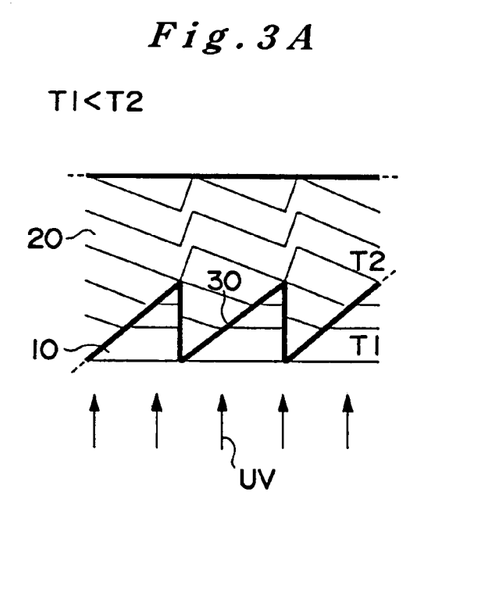
FIG. 3A shows contour lines that describe the distribution of light intensity for a case where the transmittance of the first element is lower than that of the second element.
Figure 3B:
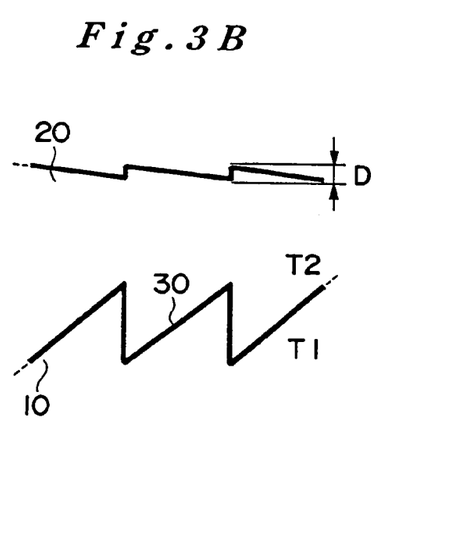
FIG. 3B is a schematic diagram that describes the condition of the resin as the second element cured by a light irradiation for the same case, where the transmittance of the first element is lower than that of the second element.

For example, if the transmittance of the first element 10 is higher than that of the second element 20, i.e., T1>T2, the "T1" representing the transmittance of the first element 10 while the "T2" representing that of the second element 20, then light intensity gradients exist in the layer of the second element 20 as described by light-intensity distribution contour lines in FIG. 2A. As a result, an embossing D with up-and-downs is generated on the surface of the second element 20 in the same direction as the diffraction grating as shown in FIG. 2B. On the other hand, if the relation is T1<T2, then light intensity gradients exist in the layer of the second element 20 as described by light-intensity distribution contour lines in FIG. 3A. As a result, an embossing D with up-and-downs is generated on the surface in the direction opposite to that of the diffraction grating as shown in FIG. 3B.

Because this embossing D is caused by the diffraction grating 30, the minute up-and-downs of the embossing D have a periodicity, so the embossing itself exhibits a certain degree of diffractive effect. This means that the diffractive optical element 1 with the embossing D has a diffraction grating on the outer surface of the second element 20 in addition to the original diffraction grating 30, which is created at the boundary surface of the first and second elements 10 and 20. This additional grating is an impediment in achieving a desired optical performance. Therefore, it is important to reduce the embossing D as much as possible for achieving a good optical performance.

Now, the embossing D will be explained quantitatively. As shown in FIG. 1, on the surface of the second element 20, the light intensity IA at a thinnest point A and the light intensity IB at a thickest point B of the second element 20 are determined. In this case, the thinnest points are located in the extensions of the tips a1 of the diffraction grating 30 while the thickest points are located in the extensions of the troughs b1 of the diffraction grating 30.

Light intensities IA and IB at points A and B on the surface of the second element 20 can be defined as following formulas (1) and (2) for a case where the intensity of the light incident from the lower side of the first element 10 is 1.0.

$$IA = T1^{(H/10000)} \times T2^{(L/10000)} \quad (1)$$

$$IB = T2^{((L+H)/10000)} \quad (2)$$

In the formulas, the "H" (μm) represents the height of the diffraction grating, the "L" (μm) represents the thickness of the second element 20, the "T1" represents the transmittance of an ultraviolet ray (for example, the i-line of mercury: λ=365.0 nm) per 10 mm through the first element 10, and the "T2" represents the transmittance of an ultraviolet ray (for example, the i-line of mercury) per 10 mm of the second element 20.

Therefore, the ratio IB/IA of the light intensities is defined by formula (3).

$$IB/IA = (T2/T1)^{(H/10000)} \quad (3)$$

As mentioned above, the embossing D is generated by differences in cure shrinkage in the layer of the second element 20, and these differences arise from the difference between light intensity IA at point A, which intensity is defined by conditional expression (1), and light intensity IB at point B, which intensity is defined by conditional expression (2). For controlling the generation of the embossing D, a range of values that satisfy conditional expression (3) must be determined to make the difference between the light intensities IA and IB at these points A and B as small as possible.

Therefore, the inventor of the present invention, after carrying out various experiments and considering every aspect, has determined a condition that results in a good optical performance, which is not affected by the diffractive effect of the embossing D. With the "H" representing the height of the diffraction grating 30, the "T1" representing the transmittance of the i-line through the first element 10, and the "T2" representing the transmittance of the i-line through the second element 20 in the following formulas, if the second element 20 is to be cured by the i-line through the first element 10, then it is preferable that the diffractive optical element 1 be designed to satisfy formula (4).

$$0.990 \leq IB/IA \leq 1.010 \quad (4)$$

This conditional expression (4) can be rearranged as formula (5) from formula (3).

$$0.990 \leq (T2/T1)^{(H/10000)} \leq 1.010 \quad (5)$$

If the diffractive optical element 1 according to the present invention is made from materials with transmittances T1 and T2 that satisfy conditional expression (5), then there is little difference in the intensity of the light (ultraviolet rays) reaching the surface of the second element 20 at point A and at point B, resulting in a much smaller embossing D. As a result, the diffractive optical element 1 is protected against harmful rays, which would be otherwise diffracted from the embossing D, so it achieves a good optical performance. On the other hand, if the upper limit and the lower limit of conditional expression (5) are exceeded, then the embossing D, which is generated on the second element 20, becomes larger. As the size of the embossing D approaches the wavelength of the light used for the diffractive optical element, the diffractive effect of the embossing D, which affects the effect of the original diffraction grating 30, can be ignored no longer. In such a condition, the diffractive optical element that is not up to a desired performance can generate a flare.

According to the present invention, it is preferable that the transmittance T1 of the first element 10 and the transmittance T2 of the second element 20 be substantially equal to each other (but they are made from different materials as mentioned above. Therefore, the materials for the first element 10 and the second element 20 are selected such that they have equivalent transmittances T1 and T2 but have, for example, different refractivities n1 and n2). By satisfying this condition, the intensities IA and IB of the light that passes through the layer of the first element 10 and through the diffraction grating 30 and reaches the surface of the second element 20 are made substantially equal to each other at points A and B, so the amounts of the cure shrinkage of the resin at points A and B are also made even, preventing generation of an embossing D on the surface of the second element 20. As a result, the diffractive optical element 1 can achieve a desired optical performance.

Now, a procedure for fabricating a diffractive optical element 1 according to the present invention is described with a disk-like diffractive optical element as a first embodiment. In the following explanation, the first element 10 is represented by an ultraviolet-curable resin 10' while the second element 20 is represented by an ultraviolet-curable resin 20'.

At first, preparations are made for a first metal die 50, which has a relief for a diffraction grating 30 in a predetermined pattern, and for a base glass plate 60, which has predetermined surfaces (and transmits ultraviolet rays UV described later). A first ultraviolet-curable resin 10' is heated sufficiently to have plasticity in preparation. Preferably, the first ultraviolet-curable resin 10' has a transmittance T1 that is applied in the following embodiments 1~8.

Figure 4A:
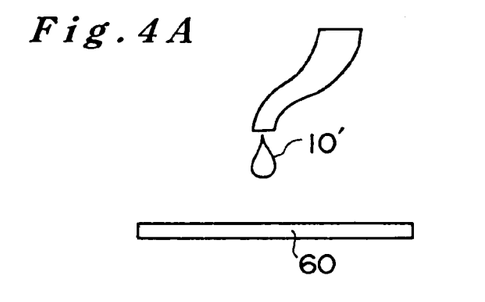
FIGS. 4A~4H show, in procedural order, steps for fabricating the diffractive optical element according to the present invention.
Figure 4B:
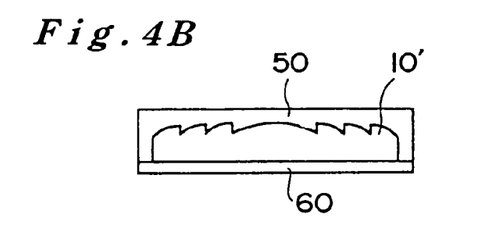
Figure 4C:
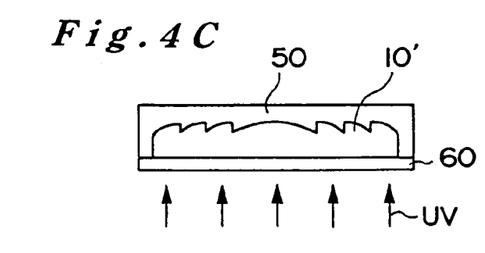
Figure 4D:
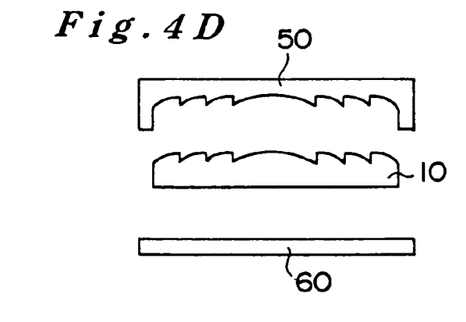

Then, the first ultraviolet-curable resin 10', which has been heated sufficiently to have plasticity, is dropped on the base glass plate 60 (refer to FIG. 4A). The dropped first ultraviolet-curable resin 10' is stamped with the first metal die 50, which has a relief whose shape is counter to the predetermined diffraction grating 30 (refer to FIG. 4B). Now, the first ultraviolet-curable resin 10' is cured by ultraviolet rays UV incident from the outward side of the base glass plate 60 (refer to FIG. 4C), and the cured first ultraviolet-curable resin 10' is removed from the first metal die 50 and the base glass plate 60 (refer to FIG. 4D). As a result, a first diffractive optical element 10 is completed with a diffraction grating 30, which is embossed on the first ultraviolet-curable resin 10' by the counter-relief pattern of the diffraction grating on the first metal die 50.

Figure 4E:
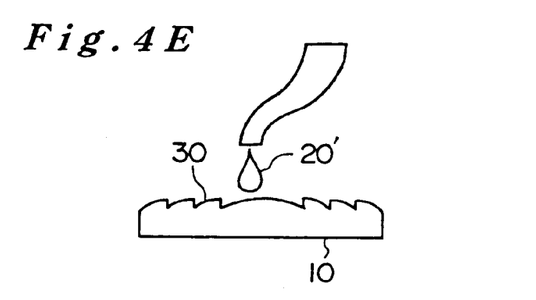
Figure 4F:
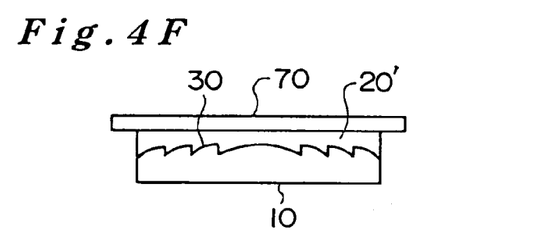
Figure 4G:
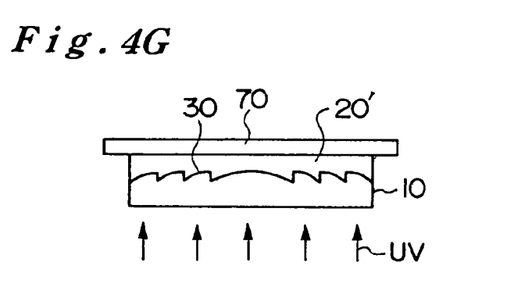
Figure 4H:
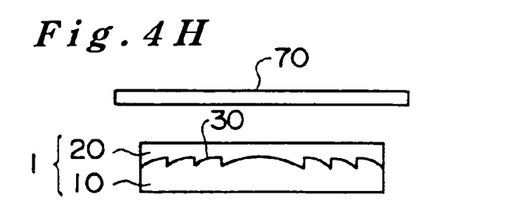

Now, on the surface of the first diffractive optical element 10, where the diffraction grating 30 is created as described above, a liquid resin as a second ultraviolet-curable resin 20' is dropped in an appropriate amount (refer to FIG. 4E). Preferably, the second ultraviolet-curable resin 20' has a transmittance T2 that is applied in the following embodiments 1~8. Then, the surface of the dropped second ultraviolet-curable resin 20' opposite to the diffraction grating 30 is stamped with a second metal die 70 for surface formation (refer to FIG. 4F), and the second ultraviolet-curable resin 20' is irradiated and cured by ultraviolet rays UV (refer to FIG. 4G). As a result, the second diffractive optical element 20 is formed on the first diffractive optical element 10 in a bonded condition. Finally, the second metal die 70 used for surface formation is removed to complete a bonded bilayer diffractive optical element 1 according to the present invention, which comprises the first diffractive optical element (first ultraviolet-curable resin) 10 and the second diffractive optical element (second ultraviolet-curable resin) 20 (refer to FIG. 4H).

Figure 5A:
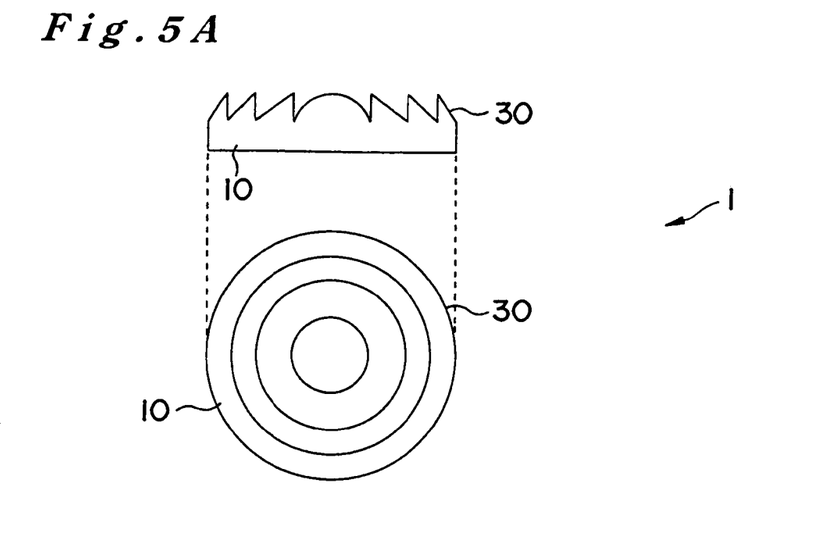
FIG. 5A shows a case where a diffraction grating is created concentrically.

The diffractive optical element 1 according to the present invention is not limited to the above embodiment. For example, the first element (diffractive optical element) 10 of the above described embodiment is an ultraviolet-curable resin, which is cured by an ultraviolet-light irradiation. However, the material of the first element can be a thermoset resin, which is set by heating, i.e., another process. Furthermore, the diffraction grating 30, which is shown in a series of sawteeth in FIG. 1, can be shaped concentrically as shown in FIG. 5A (the second element 20 is not shown in FIG. 5A).

Moreover, the diffractive optical element 1 according to the present invention can be formed with a diffraction grating 30 that is created on a curved surface not on a plane surface as shown in FIG. 1. In other words, the diffraction grating 30 can be created on a convex surface or on a concave surface.

Figure 5B:
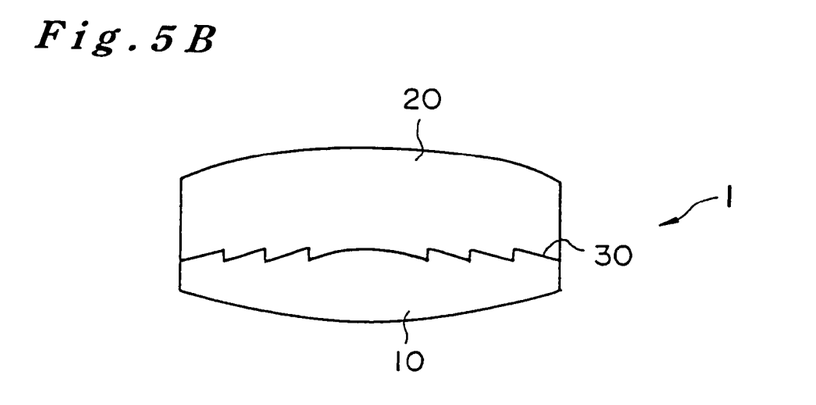
FIGS. 5B and 5C show cases where diffraction gratings are created on curved surfaces, respectively.
Figure 5C:
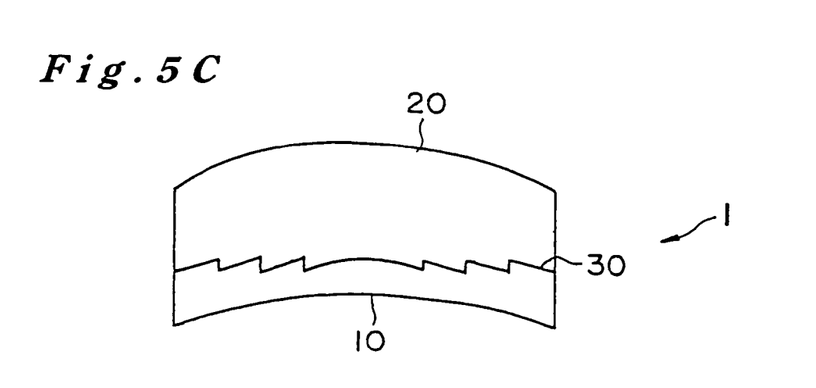

The diffractive optical element 1 according to the present invention can be used as a lens that focuses light rays of a specific order of diffraction. In this case, the diffractive optical element is formed in a disk-like contour, so it can take a contour of a plane-parallel plate as shown in FIG. 1 or a contour of a convex lens as shown in FIG. 5B or a concave lens as shown in FIG. 5C.

Now, embodiments 1~16 of diffractive optical element according to the present invention and references 1~8 are presented to explain how the upper limit and the lower limit of conditional expression (5) can be determined. In embodiments 1~16 and references 1~8 listed below, the second element 20 of each diffractive optical element 1 is cured by the i-line ($\lambda$=365.0 nm) or the h-line ($\lambda$=404.7 nm) that has passed through the first element 10. By changing the combination of values for transmittance T1 at the i-line or the h-line and refractive index n1 at the d-line ($\lambda$=587.6 nm) of the first element 10 and for transmittance T2 at the i-line or the h-line and refractive index n2 at the d-line ($\lambda$=587.6 nm) of the second element 20, values that satisfy conditional expression (5) and values for the size of the embossing D (refer to FIG. 2B and FIG. 3B) are determined. Table 1 lists values for transmittance T1 at the i-line and refractive index n1 at the d-line of the first element 10 and for transmittance T2 at the i-line and refractive index n2 at the d-line of the second element 20 of the diffractive optical element 1 for each of embodiments 1~8 and references 1 and 2, and table 2 lists, also for each of embodiments 1~8 and references 1 and 2, values for conditional expression (5) and the size of the generated embossing D and judgments on optical performance. For these cases, the height H of the diffraction grating is 50 μm (H=50 μm).

Table 3 below lists values for transmittance T1 at the i-line and refractive index n1 at the d-line of the first element 10 and for transmittance T2 at the i-line and refractive index n2 at the d-line of the second element 20 of the diffractive optical element 1 for each of embodiments 9~14 and references 3~6, and table 4 lists, also for each of embodiments 9~14 and references 3~6, values for conditional expression (5) and the size of the generated embossing D and judgments on optical performance. For these cases, the height H of the diffraction grating is 75 μm (H=75 μm).

Table 5 below lists values for transmittance T1 at the h-line and refractive index n1 at the d-line of the first element 10 and for transmittance T2 at the h-line and refractive index n2 at the d-line of the second element 20 of the diffractive optical element 1 for each of embodiments 15 and 16 and references 7 and 8, and table 6 lists, also for each of embodiments 15 and 16 and references 7 and 8, values for conditional expression (5) and the size of the generated embossing D and judgments on optical performance. For these cases, the height H of the diffraction grating is 150 μm (H=150 μm).

The optical performance for each case listed in tables 2, 4 and 6 is determined from existence of a flare. If generation of a flare is prevented extremely well, then the optical performance is marked with "⊚" in the tables. If generation of a flare is prevented relatively well, then the optical performance is marked with "○". If generation of a flare is not prevented effectively, then the optical performance is marked with "x".

TABLE 1

(i-line: λ = 365.0 nm)

|  | First element Transmittance T1 | (refractive index n1) | Second element Transmittance T2 | (refractive index n2) |
|---|---|---|---|---|
| Reference 1: | 0.1468 | 1.553 | 0.0053 | 1.530 |
| Embodiment 1: | 0.0280 | 1.553 | 0.0053 | 1.530 |
| Embodiment 2: | 0.0155 | 1.553 | 0.0053 | 1.530 |
| Embodiment 3: | 0.1468 | 1.553 | 0.0533 | 1.530 |
| Embodiment 4: | 0.0053 | 1.553 | 0.0053 | 1.530 |
| Embodiment 5: | 0.0053 | 1.530 | 0.0053 | 1.553 |
| Embodiment 6: | 0.0533 | 1.530 | 0.1468 | 1.553 |
| Embodiment 7: | 0.0053 | 1.530 | 0.0155 | 1.553 |
| Embodiment 8: | 0.0053 | 1.530 | 0.0280 | 1.553 |
| Reference 2: | 0.0053 | 1.530 | 0.1468 | 1.553 |

TABLE 2

(i-line: λ = 365.0 nm) (H = 50 μm)

|  | $(T2/T1)^{(H/10000)}$ | Embossing D (μm) | Optical performance |
|---|---|---|---|
| Reference 1: | 0.9835 | 0.030 | X (intense flare) |
| Embodiment 1: | 0.9917 | 0.015 | ○ (minute flare) |
| Embodiment 2: | 0.9946 | 0.010 | ○ (minute flare) |
| Embodiment 3: | 0.9949 | 0.010 | ○ (minute flare) |
| Embodiment 4: | 1.0000 | 0.000 | ⊚ (no flare) |
| Embodiment 5: | 1.0000 | 0.000 | ⊚ (no flare) |
| Embodiment 6: | 1.0051 | 0.010 | ○ (minute flare) |
| Embodiment 7: | 1.0054 | 0.010 | ○ (minute flare) |
| Embodiment 8: | 1.0084 | 0.015 | ○ (minute flare) |
| Reference 2: | 1.0167 | 0.030 | X (intense flare) |

TABLE 3

(i-line: λ = 365.0 nm)

|  | First element Transmittance T1 | (refractive index n1) | Second element Transmittance T2 | (refractive index n2) |
|---|---|---|---|---|
| Reference 3: | 0.1468 | 1.553 | 0.0053 | 1.530 |
| Reference 4: | 0.0280 | 1.553 | 0.0053 | 1.530 |
| Embodiment 9: | 0.0155 | 1.553 | 0.0053 | 1.530 |
| Embodiment 10: | 0.1468 | 1.553 | 0.0533 | 1.530 |
| Embodiment 11: | 0.0053 | 1.553 | 0.0053 | 1.530 |
| Embodiment 12: | 0.0053 | 1.530 | 0.0053 | 1.553 |
| Embodiment 13: | 0.0533 | 1.530 | 0.1468 | 1.553 |
| Embodiment 14: | 0.0053 | 1.530 | 0.0155 | 1.553 |
| Reference 5: | 0.0053 | 1.530 | 0.0280 | 1.553 |
| Reference 6: | 0.0053 | 1.530 | 0.1468 | 1.553 |

TABLE 4

(i-line: λ = 365.0 nm) (H = 75 μm)

|  | $(T2/T1)^{(H/10000)}$ | Embossing D (μm) | Optical performance |
|---|---|---|---|
| Reference 3: | 0.9754 | 0.042 | X (intense flare) |
| Reference 4: | 0.9876 | 0.021 | X (intense flare) |
| Embodiment 9: | 0.9920 | 0.014 | ○ (minute flare) |
| Embodiment 10: | 0.9924 | 0.014 | ○ (minute flare) |
| Embodiment 11: | 1.0000 | 0.000 | ⊚ (no flare) |
| Embodiment 12: | 1.0000 | 0.000 | ⊚ (no flare) |
| Embodiment 13: | 1.0076 | 0.014 | ○ (minute flare) |
| Embodiment 14: | 1.0081 | 0.014 | ○ (minute flare) |
| Reference 5: | 1.0126 | 0.021 | X (intense flare) |
| Reference 6: | 1.0252 | 0.042 | X (intense flare) |

TABLE 5

(h-line: λ = 404.7 nm)

|  | First element Transmittance T1 | (refractive index n1) | Second element Transmittance T2 | (refractive index n2) |
|---|---|---|---|---|
| Reference 7: | 0.9970 | 1.591 | 0.4049 | 1.554 |
| Embodiment 15: | 0.6058 | 1.530 | 0.4049 | 1.554 |
| Embodiment 16: | 0.4049 | 1.554 | 0.6058 | 1.530 |
| Reference 8: | 0.4049 | 1.554 | 0.9970 | 1.591 |

TABLE 6

(h-line: λ = 404.7 nm) (H = 150 μm)

|  | $(T2/T1)^{(H/10000)}$ | Embossing D (μm) | Optical performance |
|---|---|---|---|
| Reference 7: | 0.9865 | 0.022 | X (intense flare) |
| Embodiment 15: | 0.9940 | 0.010 | ○ (minute flare) |
| Embodiment 16: | 1.0061 | 0.010 | ○ (minute flare) |
| Reference 8 | 1.0136 | 0.022 | X (intense flare) |

As shown in tables 1~6, the diffractive optical elements as references 1~8 have embossings D that are larger than 0.021 μm, and the diffractive optical elements as references generate flares intensely, degrading their optical performances. On the other hand, the diffractive optical elements as embodiments 1~16 have relatively small embossings D, which are in a range from 0.000 to 0.015 μm. As a result, in the diffractive optical elements as embodiments, generation of a flare is prevented effectively, and each diffractive optical element has achieved a desired optical performance. In the experiment, as the size of the embossing D approached the wavelength of light rays used for the diffractive optical element, the flare became extreme.

On the basis of the results, the lower limit and the upper limit of conditional expression (5) are determined as follows. The lower limit is set at 0.990 by considering the value for conditional expression (5) of reference 1 having an embossing D size of 0.030, which value is 0.9835, and that of embodiment 1 with an embossing D size of 0.015, which value is 0.9917, in table 2 (i-line and H=50 μm), the value for conditional expression (5) of reference 4 having an embossing D size of 0.021, which value is 0.9876, and that of embodiment 9 with an embossing D size of 0.014, which value is 0.9920, in table 4 (i-line and H=75 μm), and the value for conditional expression (5) of reference 7 having an embossing D size of 0.022, which value is 0.9865, and that of embodiment 15 with an embossing D size of 0.010, which value is 0.9940, in table 6 (h-line and H=150 μm).

Also, the upper limit of conditional expression (5) is set at 1.010 by considering the value for conditional expression (5) of embodiment 8 having an embossing D size of 0.015, which value is 1.0084, and that of reference 2 with an embossing D size of 0.030, which value is 1.0167, in table 2 (i-line and H=50 μm), the value for conditional expression (5) of embodiment 14 having an embossing D size of 0.014, which value is 1.0081, and that of reference 5 with an embossing D size of 0.021, which value is 1.0126, in table 4 (i-line and H=75 μm), and the value for conditional expression (5) of embodiment 16 having an embossing D size of 0.010, which value is 1.0061, and that of reference 8 with an embossing D size of 0.022, which value is 1.0136, in table 6 (h-line and H=150 μm).

In the above embodiments, the i-line (λ=365.0 nm) of ultraviolet rays and the h-line (λ=404.7 nm) of visible light rays are used as light to cure the material of the second element. However, in a case where the material is cured by light rays at wavelengths other than these used in the above embodiments, as long as the transmittance at a wavelength used satisfies conditional expression (5), an equivalent effect can be achieved.

As described above, the inventor has found that, desirably, when different materials are selected for constituting a diffractive optical element at an optical design stage, not only the refractive indices and dispersion of the materials be considered as practiced conventionally, but also the difference in transmittance be considered and adjusted appropriately.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A diffractive optical element comprising a first element and a second element, whose materials are different from each other and which elements are bonded to each other, with a diffraction grating created on a boundary surface between said first element and said second element, wherein:
   at least said second element is made from a photo-setting resin, which is set by light rays incident through said first element;
   said diffractive optical element is set in a predetermined range of values including values that make a transmittance of said first element and a transmittance of said second element equal to each other for said light rays, so that as differences in cure shrinkage in said second element are generated by differences in intensity of said light rays caused from ups and downs of said diffraction grating created on said boundary surface of said first element, said differences in cure shrinkage are controlled within a range so as not to degrade a desired performance of said diffractive optical element; and
   said diffractive element satisfies the following condition $$0.990 \leq (T2/T1)^{H/10000} \leq 1.010$$

where "H" (unit: μm) represents a height of said diffraction grating, and for said second element to be cured by said light rays being transmitted through said first element, "T1" represents the transmittance per 10 mm through said first element and "T2" represents the transmittance per 10 mm through said second element.

2. The diffractive optical element set forth in claim 1, wherein said light rays that pass through said first element and cure said second element are ultraviolet rays.

3. The diffractive optical element set forth in claim 2, wherein said ultraviolet rays are i-line rays.

4. The diffractive optical element set forth in claim 3, wherein said first element is made from an ultraviolet-curable resin.

5. The diffractive optical element set forth in claim 2, wherein said first element is made from an ultraviolet-curable resin.

6. The diffractive optical element set forth in claim 1, wherein said first element is made from an ultraviolet-curable resin.

7. A diffractive optical element comprising:
   a first element; and
   a second element whose material is different from said first element, said first element and said second element being bonded to each other with a diffraction grating created on a boundary surface between said first element and said second element;
   wherein at least said second element is made from a photo-setting resin and said second element is cured by light incident through said first element; and
   said diffractive optical element satisfies the following condition $$0.990 \leq (T2/T1)^{(H/10000)} \leq 1.010$$

where "H" (unit: μm) represents a height of said diffraction grating, "T1" represents the transmittance per 10 mm through said first element for said light, and "T2" represents the transmittance per 10 mm through said second element for said light.

8. The diffractive optical element set forth in claim 7, wherein said light is ultraviolet rays.

9. The diffractive optical element set forth in claim 8, wherein said ultraviolet light is i-line light.

10. The diffractive optical element set forth in claim 8, wherein said first element is made from an ultraviolet-curable resin.

11. The diffractive optical element set forth in claim 7, wherein said first element is made from an ultraviolet-curable resin.

* * * * *